United States Patent [19]
Wilhite et al.

[11] Patent Number: 5,107,726
[45] Date of Patent: Apr. 28, 1992

[54] CHAIN SAW SHARPENER

[76] Inventors: George W. Wilhite; Wilma J. Wilhite, both of 5577 Murphey Rd., Rte. 1, both of Kuna, Id. 83634

[21] Appl. No.: 702,322
[22] Filed: May 20, 1991
[51] Int. Cl.$^5$ .............................................. B23D 63/08
[52] U.S. Cl. .................................... 76/36; 76/79.5; 76/80.5
[58] Field of Search ............... 51/59 R, 170 TL, 173; 76/31, 79.5, 36, 78.1, 80.5

[56] References Cited

U.S. PATENT DOCUMENTS

| | | | |
|---|---|---|---|
| 327,774 | 10/1885 | Dale | 76/31 |
| 428,832 | 5/1890 | Dudley | 76/31 |
| 542,282 | 7/1895 | Rood | 76/78.1 |
| 683,842 | 10/1901 | Bulson | 76/36 |
| 1,666,395 | 4/1928 | Miller | 76/31 |
| 2,896,481 | 7/1959 | Hebbert | 76/31 |
| 3,027,784 | 4/1962 | Weatherly | 76/36 |
| 4,010,661 | 3/1977 | Fletcher | 76/36 |
| 4,327,605 | 5/1982 | Strojny | 76/36 |

Primary Examiner—Bruce M. Kisliuk
Assistant Examiner—Bo Bounkong
Attorney, Agent, or Firm—Paul F. Horton

[57] ABSTRACT

A chain saw sharpener including a base plate; a clamp affixed to the base plate for holding the bar of a chain saw in vertical orientation; a tubular guide member affixable on the base plate at a selected angle relative to the clamp and hence the chain saw; a file carriage provided with a top rod insertible into the guide member for reciprocal and rotational movement relative thereto and an underlying bottom rod having a pair of downwardly depending file support members for giving support to both ends of the file; and a circular file rotatably mounted within the support members. A handle affixed to the file permits full foxibility and positioning of the sharpener in relation to the teeth to be sharpened. The top rod of the file carriage is provided with a free end for convenient insertion and removal from the file guide.

7 Claims, 1 Drawing Sheet

CHAIN SAW SHARPENER

BACKGROUND OF THE INVENTION

1. Field of the Invention

This invention relates to chain saw sharpeners and, more particularly to chain saw sharpeners having a fixed clamp and a guide member.

2. Description of the Prior Art

In sharpening the teeth of a chain saw, it is important that the file be firmly supported at a selected angle to the tooth to be sharpened, while at the same time, permitting convenient reciprocating motion as the file engages the teeth and rotational motion to bring the file into contact with and removal from the teeth. A number of inventions have been devise to accomplish these functions as typified by U.S. Pat. No. 2,421,657, issued to J. H. Speed for hand saws and U.S. Pat. Nos. 2,900,850, issued to R. L. Travis; 2,995,959, issued to C. C. Mills; 3,027,784, issued to W. G. Weatherly; and 4,177,697, issued to E. McDunn for chains saws.

It is very desirable, also, to have a file which may readily be removed from its file guide for reasons of portability; exchange of files, when desired; and for storage, as shown by Weatherly. But, it is equally important that the file not be cantilevered, but rather firmly supported by spaced support members, adjacent the ends of the file, as shown by the other references. No chain saw sharpeners are known which provide both functions.

Additionally, for purposes of clearing metallic filings from the grooves and ridges of the file; for even wearing of the file; for ability to twist the file during the sharpening process for obtaining a superior cutting edge and for placement of the file relative to the link supported tooth, it is desirable that the circular file itself be rotatable within its mountings. Such structure is unknown in chain saw sharpeners.

SUMMARY OF THE INVENTION

The chain saw sharpener of the present invention includes a base plate, upon which is mounted a chain saw clamp and a tube guide. The chain saw sharpener of the present invention provides for the immediate and unobstructed withdrawal of a file from its tubular guide while providing stable end supports for the rotatable file in having a novel C-shaped file carriage including a top rod, with free end, for insertion into and removal from a tubular guide and an underlying rod with downwardly depending end supports for the file. Sleeves within the end supports permit rotation of the file for clearing debris on the file, while providing a fresh surface in contact with the tooth for sharpening. Rotation of the circular file within its support members also permits ready placement of the file relative to the tooth to be sharpened.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
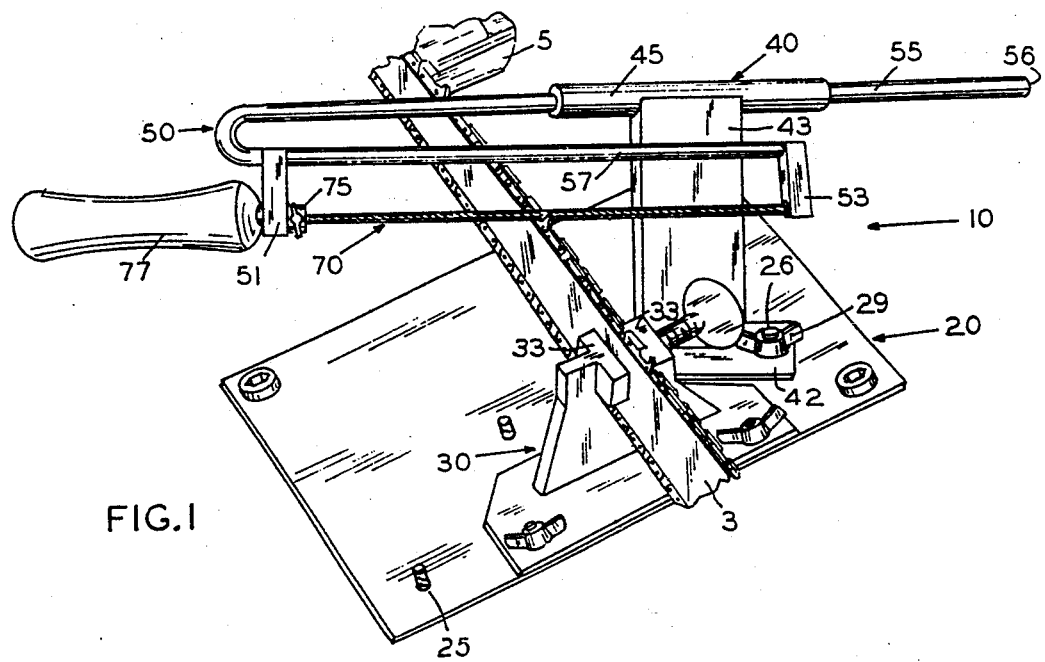
FIG. 1 is a perspective view of a chain saw sharpening device made according to the present invention, ready for sharpening the teeth of a saw.

Referring now to the drawings, an embodiment to be preferred of a chain saw sharpening device 10, made according to the present invention is disclosed. Device 10 includes, generally, a base plate 20; clamp 30; file guide 40; file carriage 50; and a circular file 70.

Base plate 20 is a simple rectangular plate constructed of any suitable material such as iron or steel, having planar opposing parallel surfaces. The base plate is provided, on its upper surface with at least two attachment members 25 and 26, positioned at a selected angle to and on opposing sides of the vertical clamping plane of clamp 30. The clamping plane is a vertical plane perpendicular to the jaws 33 of the clamp. Bar 3 of chain saw 5 lies along this plane. The angle shown for sharpening the teeth, between file 70 and bar 3 is 35°, but, of course, may be of any selected angle, depending upon the pitch of the teeth. Attachment members 25 and 26, each, as shown in FIG. 1, comprise a pair of threaded bolts extending upwardly through openings in the base plate. Such structure permits the re-positioning of file guide 40 for sharpening alternate teeth of the chain saw; usually pitched at opposing angles. Base plate 20 may be placed upon or connected to any suitable supporting surface, as for example the bed or bumper of a truck.

Clamp 30 is a conventional clamp and may be of any suitable design. The clamp shown includes one stationary jaw and one movable jaw operable to clamp chain saw bar 3 in a vertical plane, also as shown.

Only one file guide 40 is needed and only one preferred so as to give sufficient room for operation of the file and carriage. The file guide 40 includes a base portion 42, a standard 43, and a tubular guide member 45 horizontally mounted on the top of the standard. Base portion 42 of file guide 40 is provided with a pair of apertures, not shown, in registry with and for receiving threaded bolts of attachment members 25 and 26. Wing nuts 29, only one of which is shown, are used to secure the file guide to base plate 20.

Figure 2:
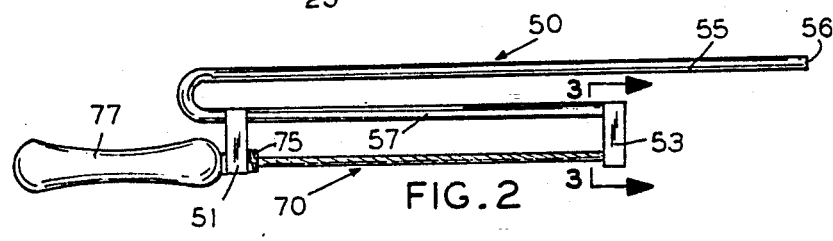
FIG. 2 is a side view of the file carriage of the present invention, holding a circular file.
Figure 4:
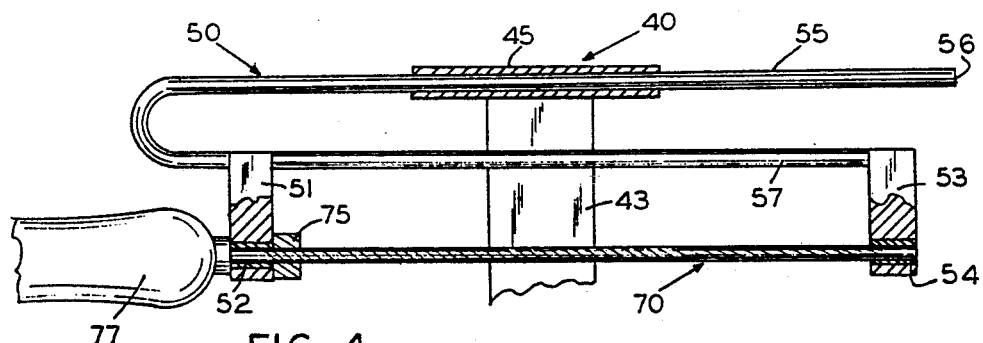
FIG. 4 is a side view, in partial section, of the file carriage and file shown mounted to the file guide.
Figure 3:
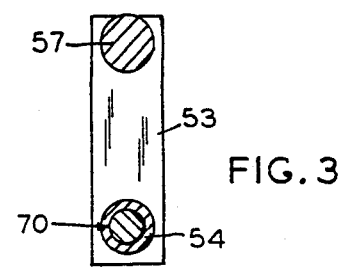
FIG. 3 is a cross-sectional view of the carriage, taken along lines 3—3 of FIG. 2

File carriage 50, shown to advantage in FIGS. 2 and 3, provides rotational movement about and reciprocating movement along the longitudinal axis of elongated tubular guide member 45. Such movement is controlled by the operator in his grasp of handle 77 of the file. Carriage 50 comprises an elongated, substantially C-shaped frame including an elongated top rod 55 and an underlying elongated bottom rod 57. Top rod 55 is circular in cross-section, in having a diameter only sligtly less than the inside diameter of tubular guide member 45, which serves as a bearing for the top rod.

Rods 55 and 57 are preferably unitary with one another. It is to be noted that top rod 55 is provided with a free, unobstructed end 56 for convenient insertion and removal from tubular guide member 45 without any disassembling of parts. Bottom rod 57 loops back directly beneath the top rod and is provided at opposing ends with downwardly depending file support members 51 and 53, respectively. Each of these support members include a sleeve 52 and 54, respectively, serving as bearings for the holding of and rotation of circular file 70.

To prevent lateral movement of the file, which would otherwise dislodge from its sleeves, a file support bearing 75, affixed to file 70 by means of a set screw, or the like, is provided. Bearing 75 is placed in a position between support member 51 and 53 and immediately adjacent support member 51 to prevent lateral movement. For rotation of the file within the sleeves and for reciprocating and rotating carriage 50, and hence file 70, along the longitudinal axis of tubular guide member 45, a handle 77, securely affixed to one end of the circular file, is provided.

The circular file is conventional and only need be of dimensions and abrasive quality suitable for sharpening the teeth of a saw.

For the sharpening procedure, the bar of the chain saw is first held tightly in place by clamp 30. With file guide 40 in the position shown in FIG. 1, top rod 55 of carriage 50 is inserted into tubular member 45 of the guide. If the tooth sought to be sharpened is in proper position, carriage 50 is simply rotated to bring file 70 into engagement with the tooth. In that the angle of sharpening is set by the disposed angle of file guide 40, simple reciprocation of the carriage, and hence circular file 70 in its engagement with the tooth, will precisely sharpen the tooth. Occasional rotation of handle 77 will bring a fresh portion of file 70 into contact with the tooth, allowing metallic filings contained between ridges of the file to be cleared and thus maximizing the efficiency of each stroke. Such rotation also permits the file to wear evenly and, it has been found, gentle twisting provides a superior cutting edge to the tooth than does simple reciprocal motion. Alternate teeth are sharpened and then file guide 40 is moved to an opposing position on attachment members 25 for sharpening of the other teeth. It has been found that rotation of circular file 70 by means of handle 77 is also handy to bring the file into proper contact with a tooth where the tooth is slightly out of linear position due to placement of the chain links. Placement of the file upon the top surface of a link and rotation of the file as it frictionally holds to the top of the link causes the link to buckle slightly upward. Further rotation of the file causes the file to roll into correct filing position with the tooth.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A sharpening device for sharpening the teeth of a chain saw, said device comprising:
   a base plate;
   a clamp affixed to said base plate for clamping a bar of a chain saw;
   a file guide mounted upon said base plate at a fixed angle relative to said clamp, said file guide provided with a tubular guide member;
   a file carriage comprising an elongated, substantially C-shaped frame including a top rod, receivable within said tubular guide member for reciprocal and rotational movement relative thereto, and underlying bottom support rod, said support rod provided with a pair of spaced, downwardly depending file support members for rotatably supporting a circular file therein; and
   a circular file rotatably mounted between said file support members, said file provided with a handle for reciprocation and rotation thereof for sharpening the teeth of a chain saw held by said clamp.

2. The sharpening device as described in claim 1 wherein said base plate is provided with at least two attachment members; each of said members positioned at a selected position relative to and on opposing sides of the clamping plane of said clamp, and wherein said file guide is moveable from one attachment member to the other for sharpening alternate teeth of the chain saw.

3. The sharpening device as described in claim 1 wherein said top rod of said guide frame is provided with a free end for unobstructed insertion and removal from said tubular guide member.

4. The sharpening device as described in claim 1 wherein each of said file support members are provided with a sleeve for receiving and rotatably supporting said circular file and further comprising a circular file support bearing affixed to said file and engaging one of said file support members to hold said file within said sleeves.

5. A sharpening device for shapening the teeth of a chain saw, said device comprising:
   a base plate;
   a clamp affixed to said base plate for clamping a bar of a chain saw;
   a file guide mountable upon said base plate at a fixed angle relative to said clamp, said file guide provided with a tubular guide member;
   a file carriage comprising an elongated, substantially C-shaped frame including a top rod provided with a free end for unobstructed insertion and removal from said tubular guide member and for reciprocal and rotational movement relative thereto, and underlying bottom support rod, said support rod provided with a pair of spaced, downwardly depending file support members, each of said file support members provided with a sleeve for receiving and rotatably supporting a circular file; and
   a circular file rotatably mounted between said file support mwembers, said file provided with a handle for reciprocation and rotation thereof for sharpening the teeth of a chain saw held by said clamp.

6. The sharpening device as described in claim 5 further comprising a thrust bearing affixed to said file and engageable with one of said file support members to hold said file within said sleeves.

7. A sharpening device for sharpening the teeth of a chain saw, said device comprising:
   a base plate provided with at least two attachment members, each of said members positioned at a selected position relative to and on opposing sides of a vertical clamping plane of a clamp;
   a clamp affixed to said base plate for clamping the bar of a chain saw;
   a file guide mountable upon said base plate by one of said attachment members at a fixed angle relative to said clamp, said file guide provided with a tubular guide member;
   a file carriage comprising an elongated, substantially C-shaped frame including a top rod provided with a free end for unobstructed insertion and removal from said tubular guide member and for reciprocal and rotational movement relative thereto, and and underlying bottom support rod, said support rod provided with a pair of spaced, downwardly depending file support members, each of said file support members provided with a sleeve for receiving and rotatably supporting a circular file; and a circular file rotatably mounted between said file support members, said file provided with a handle for reciprocation and rotation thereof for sharpening the teeth of a chain saw held by said clamp.

* * * * *